Oct. 25, 1966
C. O. JORGENSEN ET AL
METHOD AND APPARATUS FOR AUTOMATIC
SCREENING OF CARDIAC SOUND WAVES
3,280,817
Filed June 19, 1964
6 Sheets-Sheet 1
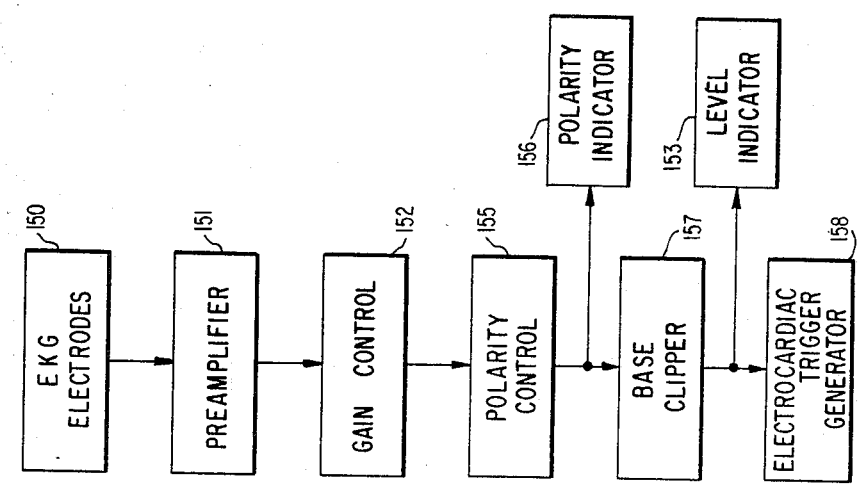
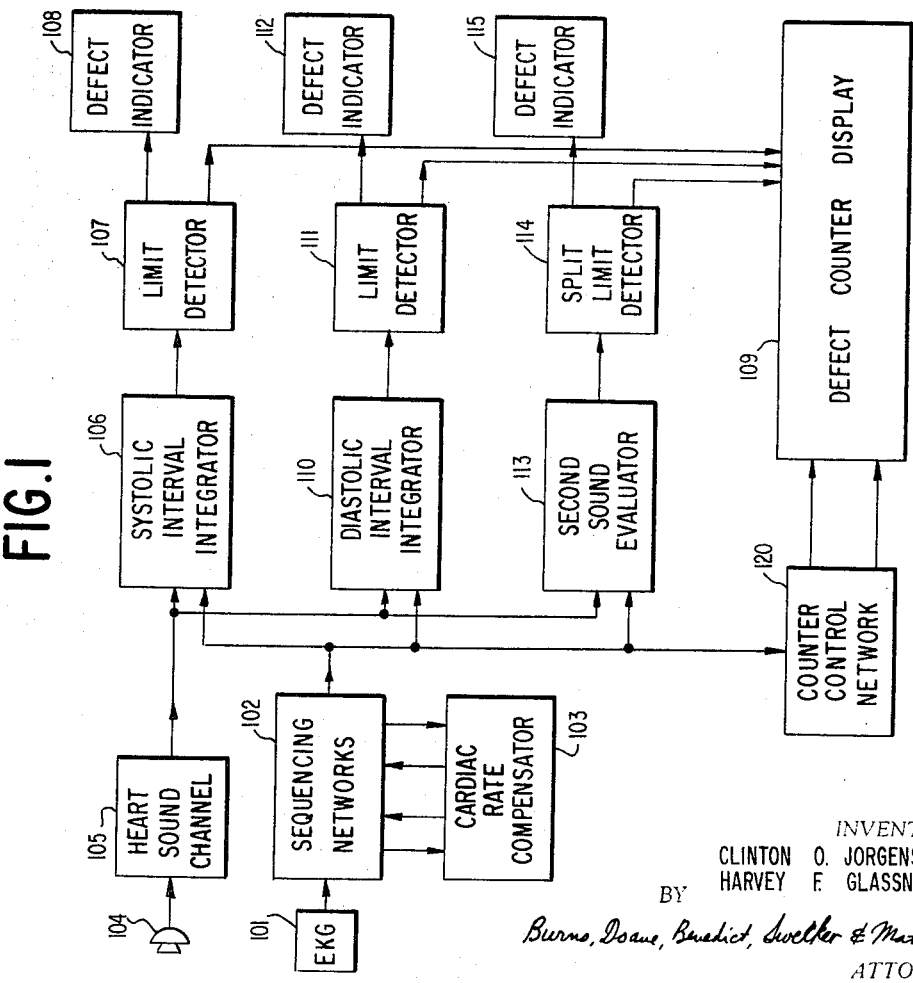
INVENTORS
CLINTON O. JORGENSEN
HARVEY F. GLASSNER
BY
Burns, Doane, Benedict, Swecker & Mathis
ATTORNEYS

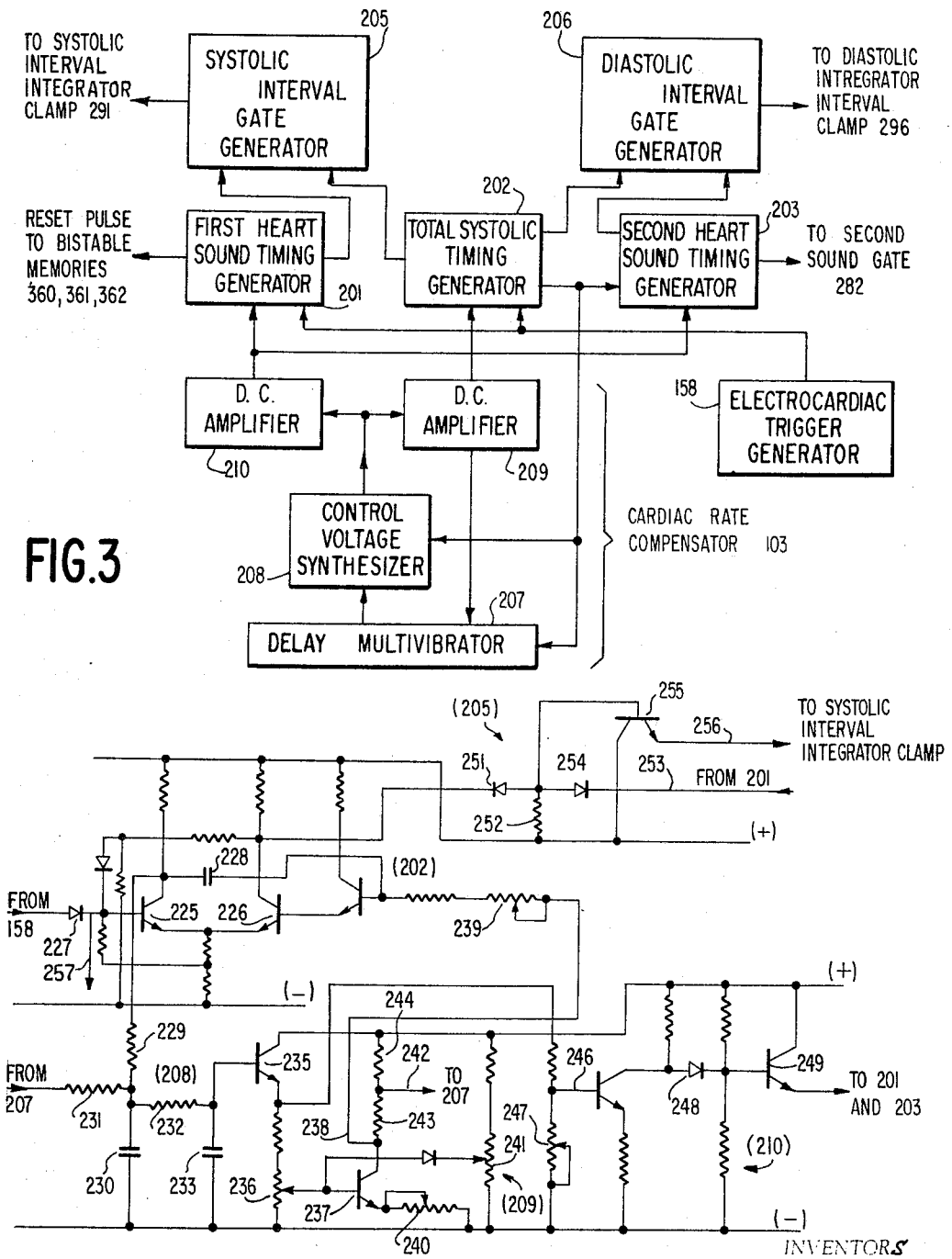

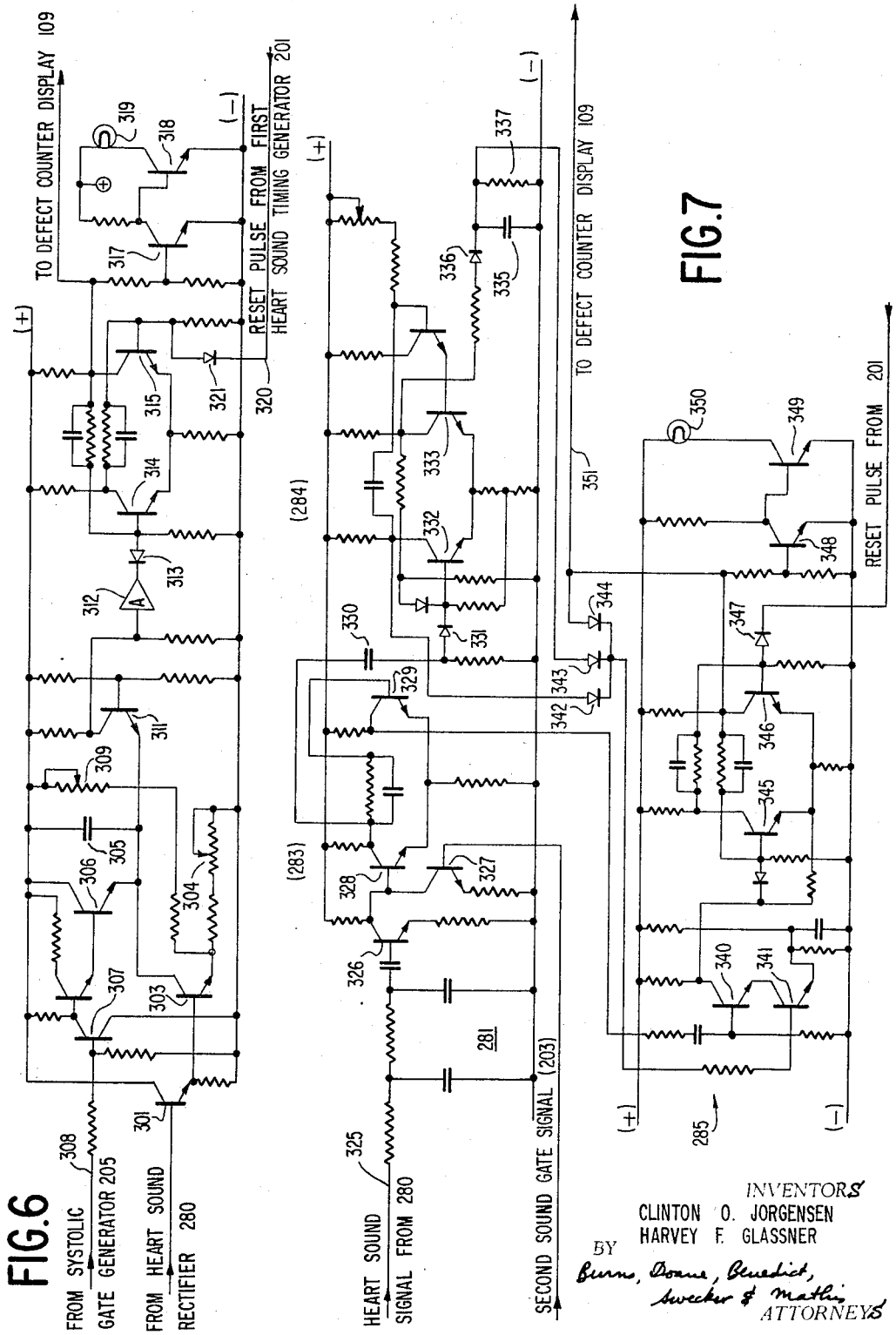

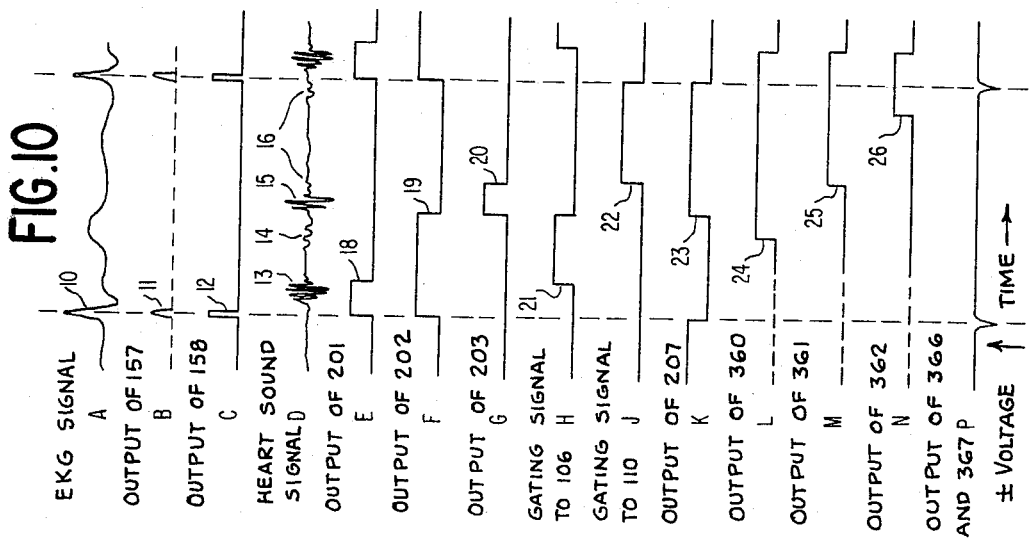
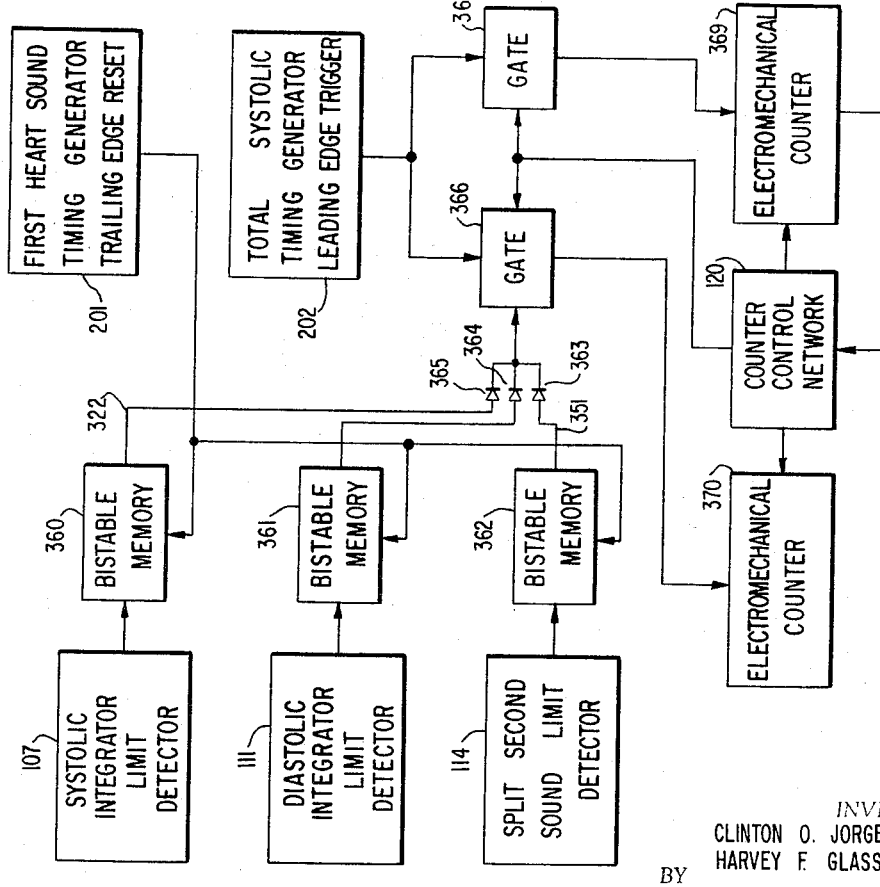

United States Patent Office 3,280,817
Patented Oct. 25, 1966

3,280,817
METHOD AND APPARATUS FOR AUTOMATIC SCREENING OF CARDIAC SOUND WAVES
Clinton O. Jorgensen and Harvey F. Glassner, Los Angeles, Calif., assignors to Thiokol Chemical Corporation, Bristol, Pa., a corporation of Delaware
Filed June 19, 1964, Ser. No. 376,394
17 Claims. (Cl. 128—2.05)

This invention is directed to a method of screening the heart action of patients as indicated by heart sounds, and apparatus for such purposes. The invention operates in dependency on heart sounds providing a low frequency compressional wave source of heart action information. The inventive method and apparatus are particularly applicable to rapid screening of large numbers of individuals for abnormal heart sound characteristics. When the method and apparatus of the present invention indicate that the subject is characterized by abnormal cardiac sounds, the individual may then be referred for further examination to professional medical personnel.

The method and apparatus of the present invention, moreover, will supply an indication of the functional time phase range of the heart cycle in which the abnormality occurs. The cause and treatment, however, will be ascertained by subsequent classical medical procedures.

The detection of abnormal heart sounds by auscultation and its diagnosis are a highly refined art, so demanding in practice as to have developed a specialized group of physicians. It is usual procedure for the general practitioner suspecting or ascertaining abnormal cardiac performance by auscultation, to refer many patients to a cardiologist. In the application of the present invention, such procedure would also normally be followed.

Auscultation of the heart demands protracted, difficult and most concentrated attention of the physician. Particularly for mass screening of large numbers of individuals, this procedure is time consuming and proportionately expensive. Through the present invention, large numbers of patients may be rapidly examined and definitive information indicated to the attendant, who is not required to be trained in auscultation or cardiology. Physicians have also found the method and apparatus of the present invention of high utility in conducting examinations of patients.

The sound wave signals generated by the heart in its recurrent cycle have been classically observed at the skin surface by the use of the stethoscope. More complex methods of analysis have involved the use of electrical microphones to pick up the compressional waves generated by the heart and amplify the same to produce a more audible signal, or to analyze the waves by electronic circuitry and cathode ray indicating devices for particular frequency characteristics or sequences. It has also been proposed that only the systolic or diastolic interval be selectively amplified for audition by the attending physician. Such prior art devices, while of undoubted merit, place heavy demands on the physician and require considerable time and study to familiarize the user in their application. Such devices, for instance, may be applied in further examination of presumptively abnormal patients after they have been so indicated by the present invention.

The recurrent cycle of the heart comprises a recognized series of successive functional time phase ranges. The cycle is begun by the contraction of the heart, which itself generates the "first" sound. The systolic interval follows the first sound, and these together comprise the total systole. This is terminated by the onset of the second sound, marking the closure of valves of the heart, and itself constituting the beginning of the total diastole. The second sound is followed by the diastolic interval which is terminated by a repetition of the first sound initiating the subsequent heart cycle.

Characteristic abnormalities in the heart cycle can be detected by direct aural observation. These most usually comprise murmurs generated during the systolic and diastolic intervals, and split second sounds. Since the murmurs are interspaced between the normal sounds of the heart, and appear at a much lower relative amplitude level, their detection and evaluation are difficult. Furthermore, it is also difficult to identify and evaluate splits in the second sound. By the method and apparatus of the present invention, the functional time phase ranges are precisely delineated, and their individual sound characteristics are electrically evaluated. If an abnormality is detected in one of such phase ranges, its presence is selectively indictated to the attendant.

In the practice of the present invention, the heart sounds developed during each systolic interval are selectively measured by an integrating circuit to determine an accumulated energy level generated by the heart in this interval of its cycle. Normally, the heart, in this portion of the cycle, generates minimal sound energy. If the energy level thus exceeds a value appropriate to the patient, such deviation from normalcy is indicated to the attendant. Similarly, the energy level developed during each diastolic interval is separately integrated, and if such value exceeds an appropriate limit, a defect is also signalled to the attendant by an appropriate indicator.

During the duration of the second sound, the compressional wave pattern may be received by another network for detecting splits in the second sound which are characteristic of abnormal heart performance. Here again, such abnormality, if detected, is signalled as such to the attendant by an appropriate indicating means.

The first sound of the heart regularly follows the generation of the R wave as detected by an electrocardiograph. This electrocardiac signal is preferably employed with the present invention to initiate operation of a series of sequencing circuits to permit the selective analysis and evaluation of the cardiac sound signals during the systolic and diastolic intervals and during the period of the second sound. The sequencing operation is controlled by electrical pulse generators sequentially responsive after the R wave to define, by the time duration of their electrical signals, together with the occurrence of the subsequent R wave; successive periods corresponding to the duration of the first sound, the systolic interval, the second sound, and the diastolic interval, all with due compensation in regard to the cardiac rate encountered.

Reference to the systolic interval, for instance, should not be taken to infer that any fixed or absolute time duration is thereby ascribed. The overall duration of the heart cycle, between the initiation of immediately successive first sounds, varies widely from patient to patient, and occurs over a wide rang of absolute time values in any individual. Thus, the first sound may recur at a frequency range extending from lower than forty beats per minute to more than one hundred and forty beats per minute. It is well known that the heart rate rises almost immediately above its normal rate in an inactive patient upon exercise, and thereafter gradually subsides. Furthermore, particularly in infants and young children, the rate of the heart beat is observed to undergo spontaneous variations over a wide range. It will therefore be understood that proper sequencing of cardiac sound signals during the successive functional cardiac phases for electrical measurement, requires continuously varying adaptation from subject to subject, and also during the examination of any particular individual.

It would perhaps be possible for a trained physician, by aurally monitoring an audible cardiac sound signal passed during an adjustable interval established by a time gating circuit, to adjust apparatus to the necesary limits under the instant circumstances. If the adjustment is maintained, the gated signal could then be electrically analyzed for characteristics outside normal limits as taught by the present invention. Should the heart rate change, however, the second sound would drift into the period established for either the systolic or diastolic interval and produce a false abnormal indication. Continuous professional attention would be demanded, and it would be impossible to monitor more than one gated channel at a time. The present invention provides for automatically adjusting the time sequencing in dependency on the basic cardiac rate and electrically evaluating the signals received during the successive sequencing periods in each of which a particular function of the overall heart cycle subsists.

Auxiliary features of the present apparatus provide for the detection of a negative R wave characteristic, and accommodate such an electrical signal in the electrocardiac signal responsive network by providing a polarity reversing switch.

It is a further feature of the present invention to permit the operator to adjust the instrument to monitor a selectively preset number of cycles and determine the number of cycles outside normal limits detected during this sequence.

Where reference is made herein to cardiac sound signals, it is not intended thereby to exclude subaudible frequencies, so that the compressional wave energy so identified may include all, or substantial portions of the entire such spectrum generated by cardiac action. Furthermore, for convenience in the following disclosure, the terms cardiac sound signals and the like, include signals derived from the originally generated cardial sound waves by frequency filtering or selective amplification, and electrically selected portions or transposed versions of cardiac sound signals, such as single or full wave rectified signals, as well as cardiac sound signal excursions above a limiting value.

It is accordingly the object of the present invention to provide a novel method and apparatus for the purposes described. The invention will be further described with reference to the appended drawings, in which:

FIGURE 1 is a simplified block diagram of the overall system.

FIGURE 2 shows, in block diagram, the electrocardiac signal channel.

FIGURE 3 shows, in block diagram form, the sequencing circuits and the cardiac rate compensator.

FIGURE 4 shows circuitry for sequencing and cardiac rate compensation components of FIGURE 3.

FIGURE 6 shows circuitry for the systolic integrator and its defect indication network.

FIGURE 7 shows a circuit for second sound evaluation and defect indications.

FIGURE 8 shows, in block diagram form, components of the defect counter display.

FIGURE 10 shows representative wave forms of the system.

Figure 5:
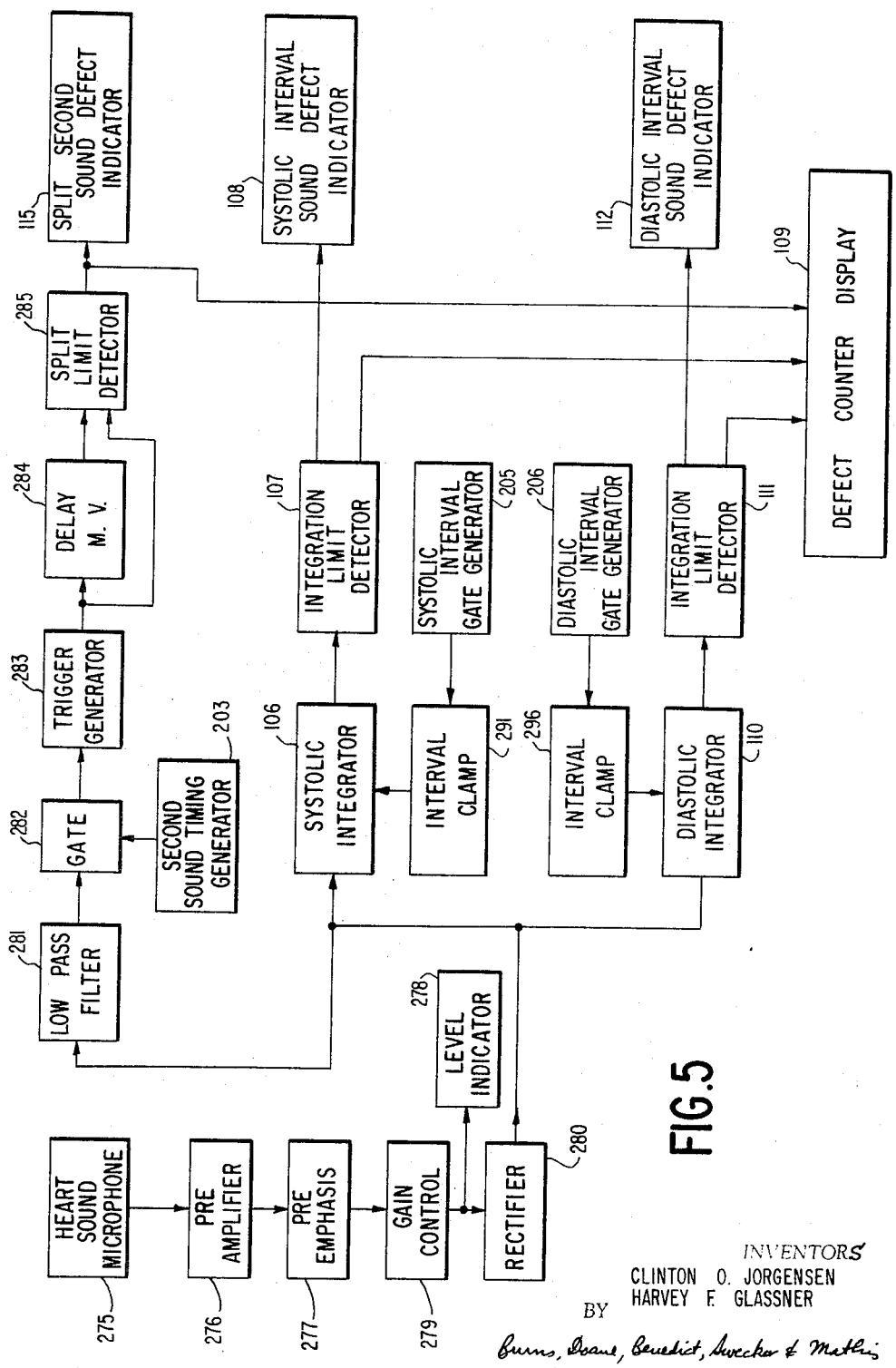
FIGURE 5 shows, in block diagram form, the main components of the heart sound channel, with the evaluation and sound defect indication circuits.

The operational configuration of apparatus for effecting the present invention is shown diagrammatically in FIGURE 1. The synchronizing phase information is derived from electrocardiac channel 101. It has been found for synchronization purposes to derive this signal from a pair of electrodes applied to the subject at the level of the seventh intercostal space on the mid-clavicular line. The electrocardiac signal is processed to derive an output pulse substantially synchronized with the peak of the R wave, and for this purpose will be suitably pre-amplified, passed through a band pass network, base clipped to sharpen the signal, and applied to a trigger network for deriving a short timing pulse used in controlling the operation of the sequencing circuits. The electrocardiac network generally includes a gain control and a level indicator for standardizing the synchronizing signal. Since it is convenient to employ a trigger circuit responsive to a particular polarity, means will be described below for the detection of a negative R wave from the subject. Presence of a negative R signal may be physiologically significant. When such a condition is indicated, a reversing switch may be employed to invert the signal before its application to the subsequent networks.

The electrocardiac synchronizing signal is directly applied to the sequencing networks 102. These networks generate timing signals defining the successive functional time phase ranges corresponding to the successive heart functions in the cardiac cycle. The sequencing networks supply signals to, and receive control voltages from, the cardiac rate compensator 103. The action of the compensator maintains the selective time sequencing for the functional subdivisions of the overall cardiac cycle in conformity with the durations of these individual functions as they depend on cardiac rate. Thus, the output signals from the sequencing networks 102 are adapted to control the time phase ranges in which the evaluation circuits receive, or respond to, the heart sound signal.

Heart sound channel 105 receives the compressional wave signal from the heart as transduced by microphone 104. As in auscultation, microphone 104 may well be successively applied to four or more conventional locations on each patient. The heart sound channel, it has been found, preferably accentuates the heart sound frequencies adjacent to a center frequency of a hundred and fifty cycles. This effective pre-emphasis is significant in the present invention and contributes to the close correlation of the present screening method and apparatus with the results of professional auscultation.

Heart sound channel 105 will also normally comprise a suitable gain control and level indicator for standardizing the signal applied to the evaluation circuits.

Considering the successive functional divisions of the cardiac cycle in order, the first heart sound has not been found particularly significant in regard to electrical screening. In the present invention, therefore, the systolic interval is the first to be electrically evaluated. For this purpose, the heart sound signal is applied to the systolic interval integrator 106. As will appear below, it is preferable for design convenience to pass the heart sound signal through a full wave rectifier before integration. Moreover, a more significant evaluation is obtained if low level signals as are often encountered in normal subjects are discriminated against by base clipping before integration. The operation of the systolic interval integrator 106 is precisely confined to the required systolic interval period by control signals from the sequencing networks 102. While the heart sound signal could be suitably gated into the integrator to exclude the reception of sound waves generated during other portions of the cardiac cycle, it is preferred to clamp the integrating impedance used in the elevation network, or more specifically to shunt the same with a low impedance, except during the systolic interval.

During the cardiac cycle, therefore, integrator 106 develops an increasing signal in and to the extent that a cardiac murmur or murmurs are present during this portion of the cycle. As will appear, in this specific embodiment the integration is accomplished by charging a condenser to an ultimate voltage which depends upon the accumulated sound energy generated by the heart in the systolic interval. If this voltage exceeds a pre-selected limit appropriate to the subject, a limit detector 107 responds and operates defect indicator 108 to inform the attendant that, so far as that cardiac cycle was concerned, the subject would merit professional attention. At the same time, the limit detector 107 would also transmit a signal to the defect counter display 109, which will be further described below.

Evaluation of murmurs during the diastolic interval is achieved in an entirely similar manner, and if desired could be accomplished in the same integration network since the two functional phases of the cardiac cycle are evaluated at different times. In this specific embodiment, however, an additional integration network 110 is employed which similarly may activate limit detector 111 and thus operate defect indicator 112. It should not be inferred, however, that the voltage level requisite for operation of limit detector 111 is necessarily the same as that to which the systolic limit detector 107 responds.

The operation of the diastolic interval integrator 110 is precisely conformed to the functional period desired by controlling signals which it receives from the sequencing networks 102. Its operation is accordingly instigated at the termination of the second sound and terminated in response to the immediately subsequent R wave in the succeeding cardiac cycle.

The diastolic interval limit detector 111 also supplies a signal for the defect counter display 109.

Sequencing networks 102 supply additional signals bracketing the second sound of the heart cycle, and thus limit the operation of the second sound evaluator 113 to the precise time phase range desired. In this connection, a gating circuit is employed so the heart sound signal is supplied to the second sound evaluator only during this portion of the cycle.

The significant defect most generally encountered in the second sound is substantial negative amplitude modulation, which divides the sound into portions which are separate or connected by intervening periods of significantly lower amplitude. These splits, whether they comprise interruptions of substantial absence of sound energy, or significant decrease in the sound energy, instigate operation of the split limit detector 114 to activate the defect indicator 115 and alert the attendant that the subject, on that cardiac cycle, exhibited defective characteristics outside normal limits for the second sound. Similarly, limit detector 114, if activated, transmits a signal to defect counter display 109.

The operation of cardiac rate compensator 103 is selectively designed to accommodate changes in the cardiac rate, and as will further appear, achieves a further discrimination between the resulting variation in the lengths of the systolic and diastolic intervals as compared to those applied in defining the lengths of the first and second sound. It has been discovered that close correlation in the operation of the present invention with the results of professional auscultation is achieved by varying the lengths of the systolic and diastolic intervals inversely with the cardiac rate over the entire range at which the latter is encountered; but that the time phase ranges allotted for the first and second heart sounds should be relatively constant except for the imposition of a limited progressive contraction as the cardiac rate attains values above a selected rate between 95 and 105 beats per minute. A suitable threshold value would be 100.

The structure of the defect counter display 109 will be described in detail below, but it may be mentioned that this counter can be preset to monitor a desired number of cardiac cycles, such as for instance as 20 or 30 counter control network 120 is provided for this purpose. Each cardiac beat is represented by a signal applied to the counter control network from sequencing networks 102, and the number of counts evaluated is shown to the attendant most conveniently by a dial operated by a stepping switch responsive to this signal. At the same time, a defect counter will be operated on any cycle in which any one or more of the defect indicators 108, 112, or 115 are operated by their appropriate defect detectors 107, 111 and 114 respectively. At the end of the preselected number of counts, the defect counter display becomes nonresponsive to additional incoming signals, although the defect indicators will remain in operation. The attendant may then apply the input transducer to a subsequent subject or adjust the microphone, and reset the defect counter display to begin another series of cardiac sound evaluations.

The electrocardiac signal channel is shown in more detail in FIGURE 2. The input signal is taken from the subject at EKG electrodes 150 and fed to a pre-amplifier network 151. A suitable band pass for use of the electrocardiac signal for synchronizing the heart sound sequencing networks is a fraction of a cycle (such as 0.2) to 100 cycles per second. A gain control 152 is provided for standardizing the trigger signal as indicated on level indicator 153. A polarity control or reversing switch 155 is provided to accommodate subjects who are characterized by a negative R wave. The approximate form of the electrocardiac signal is shown in FIGURE 10A where the R wave appears at 10. In case the polarity of this wave were inverted, the subsequent circuits would not respond, and such inversions are indicated to the attendant by polarity indicator 156. In case inversion is so indicated, the polarity of the signal is reversed by operation of polarity control 155.

The electrocardiac signal is next fed to a base clipper 157 whose output will be substantially the form shown in FIGURE 10B, a series of pulses 11 appearing at the cardiac repetition rate. The pulses 11 are adjusted to a standardized amplitude and activate Schmitt trigger generator 158 which generates a short synchronizing pulse 12 as shown in FIGURE 10C.

The pulses 12 appear, for any particular subject, at substantially constant phase relation with the first heart sound signal itself, and are used to control the operation of the sequencing circuits as will appear below. Trigger generator 158 might alternatively be designed as a monostable multivibrator acting responsively to pulses 11 to generate a synchronizing signal of a few milliseconds duration.

Other types of synchronizing signals may well be derived, and in fact the first heart sound itself may be pre-emphasized and suitably shaped to trigger a synchronizing signal generator. While the phase of such a cardiac-sound-derived trigger signal would be delayed slightly with respect to the R wave triggered signal above discussed, such minor variations are relatively insignificant and may be accommodated by appropriately changing the time constsants of the sequencing network, if desired.

Polarity indicator 156 receives the electrocardiac signal shown in FIGURE 10A, which, if characterizing the normal or positive subject will not activate the indicator. The indicator is, however, provided with an asymmetrical input circuit comprising a diode type of detector poled to conduct the signal produced at this point in the network by a negative R wave subject. The signal conducted by the diode may then be applied to a pulse stretcher which, responsively to each R wave transmitted by the electrocardiac network, generates a prolonged pulse to trigger a transistor in series with a small indicating light bulb in saturated conduction, so that the attendant is made aware that the polarity control 155 should be reversed to accommodate the subject's electrocardiac signal for operation of trigger generator 158. Conveniently, the pulse stretching multivibrator may have an activated period in response to the diode's signal a few hundreds of milliseconds.

The operational relationships of the components of the sequencing networks and the cardiac rate compensator will be explained in connection with the block diagram of FIGURE 3. These components operate under control of pulse signals 12 supplied by electrocardiac trigger generator 158. This signal is fed simultaneously to two time base generators 201 and 202. These timing circuits are conveniently constructed as monostable multivibrators which respond to an input trigger signal by shifting to their transient phase, recovery from which is preferably timed by a resistance-capacitor network which, when it attains a predetermined voltage, causes the circuit to shift back to its normal stable condition. As will further appear, the duration of the transient phase may very conveniently be controlled by applying in addition to the normal circuit potentials a control voltage for varying the rate of charge of the controlling condenser.

Since the sequencing network in the present application is designed to operate in conformity with the successive functional phases of the heart cycle as reffected in the heart sound, a typical heart sound signal is shown in FIG. 10D. Here the wave train 13 represents somewhat diagrammatically the first heart sound, wave train 14 represents the appearance of a murmur in the systolic interval, the wave train 15 indicates a normal second heart sound, and wave trains 16 represent murmurs in the diastolic interval.

Timing generator 201 is designed to produce a pulse signal such as is shown at 18 in FIG. 10E, generally corresponding in length to the first sound at a cardiac rate of about 70 beats per minute. Initiated at the same time is the operation of timing generator 202 whose output signal, after receiving the trigger signal, persists for the duration of the total systole and thus terminates before the onset of the second sound. The output of generator 202 is shown at 19 in FIG. 10F.

The trailing edge of signal 19 is employed to initiate operation of the second heart sound timing generator 203. The latter's output is shown at pulse 20 in FIG. 10G.

As in the other timing generators, the second heart sound timing generator 203 is also a monostable multivibrator having a resistance-capacity timing circuit whose characteristics, under the applied energizing voltage, conform its unstable phase to a duration corresponding to the desired period allotted to the second sound. Again, this timing circuit is susceptible to variation under the application of a control voltage which, as will appear, depends upon the cardiac rate of the subject.

With reference to the pulse wave forms of FIG. 10, the showings are essentially diagrammatic, and the operative polarities are not necessarily those in the actual circuitry. It will be understood, of course, that in timing generators of the type described, that where a positive going pulse is available from one element of the circuit, a negative going pulse is simultaneously present and available by connection to a different element of such circuit. Where it is desired to obtain a timing pulse of short duration for triggering another circuit for operation, such pulses are also available at either desired polarity through a connection including a small differentiating capacity to the desired component of the timing circuit. It is furthermore entirely conventional to employ amplifying components where necessary or desirable throughout the entire apparatus of the present invention, and each stage of amplification will normally invert the wave form. It is, therefore, unnecessary to refer in every instance to the desirability of such amplification, and as a further result thereof, the actual polarities employed in the specific signal sequencing circuitry will not be identified save when necessary for clarity.

Referring again to the timing generators 201, 202, and 203, it will be seen from FIGS. 10E, 10F, and 10G that these signals afford a regular successive sequence of timing signals defining the durations of the successive functional phases of the heart cycle. These signals, or their derivatives, are used to sequence the evaluation circuits for the systolic interval integrator, the second sound evaluator, and the diastolic interval integrator.

Thus, the systolic interval integrator 106 (FIGURE 1) is controlled by systolic interval gate generator 205, which is operative responsively to the output signals of the first sound and the total systole generators, 201 and 202 respectively. The systolic interval gate generator, for this purpose, comprises mixing circuit receiving pulses 18 and 19 (FIGS. 10E, 10F) in opposite polarity to provide an output pulse shown at 21 in FIG. 10H bracketing the systolic interval. It is during the duration of each pulse 21 that the systolic interval integrator 106 is unclamped and thus permitted to evaluate the heart sound energy during this functional heart period.

The output pulses 20 from the second sound timing generator 203 are applied to a gating circuit to pass the heart sounds signal only during this period to the second evaluator 113 (FIG. 1).

The diastolic interval integrator is unclamped during that period by gate generator 206. As can be seen with reference to FIGS. 10G and 10F, this gate would be properly timed to unclamp the integrator at the trailing edge of pulse 20 supplied by the second sound timing generator, and to reclamp immediately prior to the first sound of the subsequent cycle. Consequently, the leading edges of pulses 12, 18 or 19 could be utilized to terminate operation of the diastolic integrator, but for convenience in circuitry, pulse 19 (FIG. 10F) is employed for this purpose. The outputs 19 and 20 of the total systole interval generator 202 and second sound interval generator 203 are applied to suitable circuitry so that during the persistence of either of these pulses the diastolic integrator is clamped. The output of the diastolic integrator clamp generator consequently consists of a pulse 22 shown in FIG. 10J. During this interval, diastolic integrator 110 will evaluate the accumulated energy of diastolic murmurs such as shown at 16 in FIG. 10D.

The operation of the timing generator circuits, as so far described in connection with FIG. 3, has presumed a specific and stable cardiac rate. As the cardiac rate varies, of course, the duration of the respective functional periods change, and have moreover been determined to vary in different amounts with respect to the cardiac rate changes. For this reason, cardiac rate compensator 103 as shown in FIG. 1 will now be discussed in more detail in connection with the block diagram of FIG. 3.

The cardiac rate compensator employs a time delay multivibrator circuit 207 used to provide an output pulse, which under the assumed conditions subsists during the total diastole. This is pulse 23 shown in FIG. 10K. Thus, the unstable phase of delay multivibrator 207 is generated in response to the trailing edge of pulse 19 provided by the total systole timing circuit.

The action of the cardiac rate compensator is controlled by inputs taken from delay multivibrator 207, 23, and the output of the total systole timing generator, pulse 19. As will be seen with reference to FIGS. 10F and 10K, these pulses successively in contiguous duration precisely conform to the cardiac period. Both signals are conductively coupled in opposite polarity through decoupling resistors to a summing capacitor. Thus, whenever pulse signal 19 is charging the summing capacitor toward one polarity, the output pulse signal 23 from the delay multivibrator 207 is operatively charging the same capacitor in the opposite direction. Thus, under the assumed circumstances, no effective control voltage will be developed in the summing network.

Should the rate of cardiac action of a subject change from the assumed conditions, or another subject be connected for screening by the apparatus of the present invention, presenting a different cardiac rate from that previously assumed, the conditions above discussed developing a null control voltage on the summing capacitor will no longer hold. In case the cardiac rate is lower, pulse 23 will terminate prior to initiation of pulse 19. Therefore, the output of generator 207 will, during this hiatus, combine with the output of pulse generator 202 to provide a net change of potential on the summing capacitor of a predetermined polarity. Should, on the other hand, the cardiac rate increase, pulse 23 will in its terminal portion overlap and add to pulse 19. Under these conditions, obviously, the summing capacitor will develop a net voltage shift of opposite polarity. Consequently, the control voltage synthesizer 208, by suitable filtering networks, provides an output suitable to be employed in adjusting the durations of the unstable phases of timing generators 201, 202, and 203. Moreover, the control voltage synthesizer output is further employed to modulate the duration of the output pulse provided by the delay multivibrator 207 itself. Under this operation, therefore, the time periods of all the timing networks employed in the cardiac rate compensator are properly modulated in conformity with the cardiac rate of the subject to assure precise and accurate definition of the durations of the successive functional phases of cardiac action.

The present invention deals with a recurrent phenomenon which may appear over a wide range of repetition rates, from below 40 to above 140 per minute, and which furthermore can well fluctuate over a substantial range during observation. A synchronizing signal is derived from the phenomenon, in substantially constant phase relation to its initiation, and this signal provides the basis for defining the desired zero time phase position on which the analysis proceeds. In particular, the zero time phase signal is employed to initiate operation of one or a series of successive timing instrumentalities, disclosed as timing pulse generators. In the analysis of the overall heart sound signal, the synchronizing signal initiates operation of the generator for providing the total systole period.

The termination of this interval is in turn employed to initiate operation of a second timing generator. This generator operates in combination with the first generator to provide a total time delay whose duration corresponds to that of the phenomenon at an intermediate, and preferably central, repetition rate as viewed with regard to the broad range of repetition rates at which such phenomenon is encountered.

These two pulses are then combined in the control voltage synthesizer so as to produce no effective output control signal when their combined durations substantially equal the phenomenon's recurrence interval.

Should the phenomenon appear after a more prolonged interval, the second timing pulse will terminate prior to the instigation of the next appearance of the first timing pulse at zero time phase. The control voltage synthesizer network, under these conditions, will then produce a control voltage of a selected polarity which will function to prolong the first timing pulse sufficiently again to tend to bring into time coincidence the combined duration of the two pulses with new repetition interval of the phenomenon. Similarly, should the frequency of the phenomenon increase, the second timing pulse would continue after the initiation of the subsequent timing pulse, so as to produce a control voltage of the opposite polarity which in turn functions to shorten the timing period generated by the first timing pulse generator.

The second timing pulse referred to, in this specific application, will itself be proportionally contracted by the control voltage supplied by the control voltage synthesizer. The second timing pulse, however, is not itself employed in the present application of the invention to select or gate a functional time phase range of the phenomenon involved.

For this purpose, two timing pulses as described above are simultaneously initiated in the desired zero time phase position. One of these, that generates the time period for the first heart sound, is progressively contracted in time duration only above a preselected repetition rate in the upper portion of the overall repetition rate range. As just mentioned, the time duration of the signal generated by the total systole generator is varied directly with the phenomenon repetition rate throughout its range. This generator initiates operation, at the termination of its pulse, of the generator defining the period bracketing the second sound. The second sound generator, however, is controlled, as is the first sound timing generator, to shorten its pulse duration only above a predetermined frequency of the repetition rate.

The diastolic interval is selected by circuits responsive to the termination of the second heart sound timing signal, and a signal at zero time phase position. The latter signal may be derived either from the trigger synchronizing signal in the present application, or from the initial signal generated by either the first heart sound generator or the total systole generator. In this manner, the diastolic interval is thus directly conformed to the proper duration for this functional time phase range of the phenomenon over its entire broad range of frequency variation. It will be understood, of course, that the broad philosophy on which the operation of these sequencing circuits depends is directly applicable to phenomenon other than recurrent heart sound signals.

As noted above, it is desired to modulate the duration of the systolic interval inversely with the cardiac rate throughout the range encountered. For this purpose, direct current amplifier 209 feeds the output from the control voltage synthesizer to the total systole timing network 202. On the other hand, however, it is preferable only to decrease the absolute durations of the first and second sound intervals at cardiac rates lying in the upper range encountered. For this purpose, a direct current amplifier 210 having different output characteristics, also receives the control voltage developed by the control voltage synthesizer, and feeds an amplified function thereof to the first and second sound timing generators 201 and 203. It is preferable to feed a control voltage of the same characteristics as that of the total systole timer, but of less magnitude, from direct current amplifier 209 to modulate the duration of output pulse 23 from delay multivibrator 207.

As noted above, monostable time delay multivibrators 201, 202, 203, and 207 are of similar circuitry save for the time constants established by the circuit elements which are operative to define their respective timing periods. For the purposes of detailed explanation, the circuit of the total systole timing network 202 is shown in FIG. 4, together with a representative embodiment of the control voltage synthesizer 208, as well as direct current amplifiers 209 and 210 and gate generator 205.

Multivibrator 202 comprises normally non-conductive transistor 225 intercoupled with transistor 226. A positive pulse from the electrocardiac trigger generator 158 is introduced through diode 227 to throw transistor 225 into conduction. Condenser 228 normally defines the duration of the unstable phase of its operation corresponding to the total systole of the heart cycle. Wave form 19 (FIG. 10F) is conductably coupled through a resistor 229 to a summing capacitor 230, as above explained. Voltage pulse 23 from delay multivibrator 207 is coupled through the resistor 231, of equal resistance with 229, to the same summing capacitor 230. These pulses are applied in opposition from 202 and 207. When transistor 225 is transiently conducting, its low voltage output tends to discharge condenser 230 while the high voltage output from 207 tends to charge it, and vice versa. Resistor 232 and condenser 233 comprise an averaging network to supply a voltage driving transistor 235 whose output circuit develops the control voltage. Potentiometer 236 drives the base of transistor 237 comprising D.C. amplifier network 209. The output of the amplifier network is supplied to lead 238 whence the control voltage is passed through a series adjustable resistor 239 and directly controls the charging time rate of condenser 228 as above discussed.

Amplifier 209 contains a number of adjustable features for selectively controlling its output voltage as a function of the voltage delivered to the base of transistor 235. Potentiometer 236 is an input amplitude control which is effective in adjusting the time delay after onset of the first sound at which compensating control voltages are supplied by amplifier 209 to the total systole time delay network 202. Potentiometer 240 serves to adjust the range displacement of the compensating voltage. Potentiometer 241 may be employed to provide a non-linear output from the amplifier which depresses its characteristic in the lower cardiac range rates, so that the compensation of the period of the total systole falls off somewhat in the very low rate range.

Delay mulivibrator 207 receives a control voltage from amplifier 209 varying as the same characteristic function of the synthesized control voltage as does the total systole timing circuit. However, this voltage has a lesser amplitude and for this purpose lead 242 is provided between resistors 243 and 244.

The output of transistor 235 in the control voltage synthesizer is fed by lead 245 to transistor 246 of amplifier 210. Potentiometer 247 is provided for adjusting the threshold of operation of amplifier 210, so that its compensating voltage will be provided through diode 248 and amplifying transistor 249 as cardiac rates at and above the mentioned value of approximateely 100 beats per minute. The base of transistor 249 is thus connected directly to the variable resistor analogous to 239 of timing circuit 202, provided in the first and second heart sound timing networks, 201 and 203.

Returning to the systolic gate generator 205, this circuit is shown in FIGURE 4 above the mulitvibrator network. The gate-controlling signals are developed across resistor 252. During the diastolic interval, diode 251 is in strong conduction, under the collector voltage at transistor 226. During the first heart sound, diode 254 is in strong conduction since it is connected by line 253 to the collector of the first heart sound timing generator similar to transistor 225 of FIG. 4. During the systolic interval, however, neither diode is conductive. The resulting pulse 21 (FIG. 10H) is amplified at transistor 255 and supplied by lead 256 to the systolic interval integrator clamps as will be further discussed below.

The circuitry of the diastolic interval gate generator 206 is similarly designed to that of the systolic interval gate generator 205. The diastolic network, however, clamps the diastolic integrator continuously during the contiguous successive persistence of pulses 19 and 20, defining the total systole and the second heart sound durations respectively. Consequently, this network supplies an ouput control voltage precisely corresponding in duration to the diastolic interval during which the diastolic integrator is permitted to evaluate the heart sound energy then accumulated.

The diastolic interval gate generator 206 substantially duplicates the circuitry of 205, with a diode poled analogously to diode 251 connected to the collector of transistor 225 of network 202, with the other diode (a counterpart of diode 254) connected to the base of the transistor analogous to transistor 225 of the second sound timing circuit 203. The output of this diastolic gate generator is similarly derived from a summing resistor returned to the postive potential bus and driving the base of the transistor whose collector is returned to the positive bus and whose emitter supplies the necessary output signal to the diastolic integrator.

Having thus explained the sequencing networks and the cardiac rate compensator together with the control voltage synthesizer and the two direct current amplifiers, the heart sound channel will be referred to in more detail together with an explanation of the evaluation circuits and the indicator networks.

The heart sound channel and the evaluation networks are shown in block form in FIGURE 5. It will be understood that the compressional wave energy generated by the heart is picked up in the heart sound microphone 275, from which the electrical signal is normally preamplified at 276 and passed through a pre-emphasis network 277.

The heart sound spectrum as generated contains some very low sub-audible frequency components with substantial energy under 20 cycles, and extends substantially about 500 cycles. It has been found, however, that the best correlation of the present screening method and apparatus with professional auscultation is achieved by a very substantial pre-emphasis of the frequencies in the band centering on 120 to 140 cycles per second. Generally speaking, only frequencies between 20 and 400 cycles are of interest. The pre-emphasis networks, which may of course be designed with respect to the characteristics of the microphone 275 and the pre-amplifier 276, will be selected to achieve this type of output from the heart sound channel as a whole.

It is important, particularly where amplitude or energy content is being measured, to standardize the electrical heart signal. For this purpose, the level indicator 278 is provided for observation by the attendant while adjusting gain control 279.

The evaluation circuits of the present invention operate primarily in relation to the enery heart sound signal during the systolic and diastolic intervals, and with respect to negative modulation of the envelope of the sound signal during the second sound. For such circuits, it is convenient to rectify the heart sound signal, and full wave rectification is preferable. As above noted, however, such derivatives of the heart sound signal sustain its essential basic characteristics, so that such electrical versions thereof preserve the identity of the heart sound signal. Rectifier 280 will normally comprise four diodes in a bridge network.

For the purpose of second sound analysis, the heart sound signal as rectified is delivered to a low pass filter 281. This filter is designed to smooth the signals substantially, but to preserve interruptions of the second sound signal and negative modulation of its envelope for purposes to be described. The second sound phase interval of the cardiac cycle is selected in gate 282 by the signal delivered by the second sound timing generator 203, so the gate output consists solely of such second sound signals. When the signal is applied in the proper polarity to trigger generator 283, it triggers this Schmitt network to generate a standard amplitude output so long as the input is at or above a critical value. The output of 283, when the circuit relaxes, triggers a timed pulse multivibrator 284 comprising a mono-stable circuit having an unstable phase duration of a predetermined time period. Generator 283 charges a timing capacitor to a predetermined voltage level at the end of its time delay.

Trigger generator 283, however, will only be reactivated if the second sound signal transmitted through gate 282 rises again after a drop-out below the triggering value. Such action results only from an interruption in the second sound signal, or a substantial downward negative modulation of its envelope, as characterize professionally diagnosed splits in the second sound. Such splits in the second sound have, moreover, been determined to be of serious implication if their time duration exceeds a limit defined by the medical profession as longer than about 50 milliseconds, or some such order of a magnitude. Accordingly, the second sound evaluation network is designed to produce a defect signal only if a split of such magnitude is encountered. For this purpose, the time delay network comprising the condenser charged by time delay multivibrator 284 is selected such that its voltage is applied to a coincidence gate arranged so that if the voltage has not declined below a predetermined value characterized by the time delay, a subsequent operation of trigger generator 283 will cause operation of the split second sound defect indicator, provided that delay multivibrator 284 has relaxed to its steady state condition, characterizing reactivation of trigger 283 only after a signal drop-out of 50 milliseconds or more.

The split limit detector responding to these voltages is a bi-stable multivibrator network 285 which, if it so responds, remains in its activated condition to light panel indicator 115 and transmit a characterizing signal to defect counter display 109. The split limit detector 285 remains activated until the subsequent cardiac cycle wherein it is reset by the trailing edge of the first sound interval delay generator pulse.

Detailed circuitry of the second sound evaluation channel will be described below. The system of FIGURE 5 further includes a block diagram showing of the systolic interval evaluation channel, as well as the diastolic interval evaluation channel.

The systolic channel comprises integrator 106 whose operation is controlled by integrator clamp 291 which is functionally subservient to the signal supplied from the systolic interval gate generator 205. This permits integrator operation only during the subsistance of the systolic interval, the electrical energy of whose signal, preferably above a predetermined value, is accumulated to derive a voltage characteristic thereof. An integration limit detector 293 develops an output signal if the integration exceeds a predetermined voltage level. After suitable amplification, this detected voltage is employed to operate the systolic interval defect indicator 108 and also to apply a suitable signal to defect counter display 109.

The diastolic interval evaluation channel is closely similar to the systolic one as just described, and provides a diastolic integrator 295 operating only during the diastolic interval through the operation of integrator clamp 296 controlled by the output signal from the diastolic interval gate generator 206. The diastolic integrator 295 applies its output signal to a similar integration limit detector 297, and if its output voltage rises beyond a predetermined limit (which of course is not necessarily that employed in the systolic integrator channel), its output signal after amplification will operate the diastolic interval defect indicator 111 and also provide a signal to defect counter display 109.

A representative systolic interval integator circuit is shown in FIGURE 6. The rectified heart sound is continuously applied from generator 280 to the base of transistor 301. The output from transistor 301 is further amplified at transistor 303 whose emitter is returned to the negative bus through variable resistor 304 operating as a sensitivity control. Transistor 303 tends to charge integrating condenser 305 negatively in proportion to the input signal amplitude at the base of transistor 301. Normally, condenser 305 is substantially short circuited by transistor 306 under the control of the systolic interval gate generator 205, from line 256 of which transistor 307 receives its control voltage on line 308. During the systolic interval, however, transistor 306 is blocked to permit condenser 305 to charge to a voltage dependent upon the accumulated murmur energy received during the systolic interval. Variable resistor 309 connecting the emitter of transistor 303 to the positive bus provides a threshold control for adjusting the conduction of transistor 303 in response to any desired input signal energy level. Thus, resistor 309 controls the ultimate voltage to which condenser 305 charges during the systolic interval. This control is set in the desired relation with respect to transistor 311 which, in dependency on its D.C. bias conditions, will begin to conduct at a specific charge accumulating on condenser 305 to which its emitter is connected.

Thus, transistor 311 goes into conduction if and when during the systolic interval the subject exhibits undue accumulated heart sound energy. As transistor 311 goes into conduction, it develops a negative output signal which is amplified at 312 and develops conduction in diode 313.

Diode 313 applies a triggering signal to a bi-stable multivibrator comprising interconnected transistors 314 and 315. This multivibrator comprises an example of the binary memories employed in the output circuits of the three evaluation channels of the present apparatus. At the end of each first heart sound interval, these binaries are reset for that cardiac cycle, if a defect has been registered by a signal from the first heart sound interval multivibrator 201. It will be remembered that the circuit of multivibrator 201 is analogous to that of 202 shown in FIGURE 4 and the reset signal for the bistable binary memories is taken by capacitative coupling from the collector of the transistor corresponding to transistor 226 in FIGURE 4. Consequently, before diode 313 goes into conduction, transistor 315 has been cut off by the reset signal, if it was in conduction, and transistor 314 is therefore always in conduction as integration is developing during the systolic integrating condenser 305.

If condenser 305 exceeds the predetermined voltage amplitude limit, transistor 314 is then placed in cut off by diode 313 and the circuit persists in this phase until a reset.

The resulting negative signal at the collector of transistor 315 is transmitted to defect counter display 109 and also applied to the base of transistor 317. Transistor 317 then unblocks transistor 318 and places the latter in saturated conduction with panel lamp indicator 319. Thus, the attendant is given a selective indication that the subject, on that cycle, has exhibited defective systolic interval sound characteristics. At the beginning of the subsequent cycle, the reset pulse is applied from generator 201 at line 320 to reset the multivibrator through diode 321.

The circuitry of the diastolic interval integrator is entirely similar to that above described for the systolic channel. The critical energy level at which the integrating capacitor triggers the defect indicating circuit may of course be adjusted for a different detection level. The heart sound is similarly applied from rectifier 280, and the gate voltage for the clamping network is derived from the diastolic gate generator 206 whose operation has been described above.

The second heart sound channel is shown in FIGURE 7. Here on line 325 the heart sound signal is applied from rectifier 280. The signal is passed through low pass filter 281 to secure smoothing of the signals as explained in connection with FIGURE 5. In the specific embodiment of FIGURE 7, the series resistors are 100,000 ohms, and the input and output capacitors are respectively 0.05 and 0.07 microfarads. The filtered signal is applied to transistor 326 through a 2.2 microfarad coupling condenser, but the output of this transistor is normally shorted except during the second sound by transistor 327. The base of the latter transistor receives the second sound gate signal from generator 203 to unblock transistor 326 during this functional phase of the cardiac cycle.

During the second sound interval, therefore, a trigger generator comprising transistors 328 and 329 is responsive to the filtered second sound energy, as will now be described. Transistor 328 is normally blocked, while transistor 329 correspondingly conducts. So long as the second sound signal, however, exceeds a predetermined magnitude, transistor 328 assumes conduction and cuts off transistor 329. In the event there is an interruption of the second sound, or downward modulation of its envelope to a substantial degree, this trigger circuit will resume its normal state. On resumption of the second sound, or recovery from the downward modulation to the preselected amplitude level, the circuit will again resume its unstable or activated state for the duration of such signal.

The collector of transistor 328 is capacitatively coupled through condenser 330 and diode 331 to a monostable delay multivibrator 284, comprising transistors 332 and 333. In this network, transistor 332 is normally conductive but is cut off upon relaxation of trigger generator 283 to generate an output signal of predetermined duration, of the order of 50 milliseconds or less. During the activated phase of multivibrator 284, condenser 335 is charged through diode 336 and rapidly attains its charging voltage. Condenser 335 is shunted by resistance 337 to provide a controlled rate of discharge after relaxation of delay multivibrator 284. During this phase of the operation, the voltage on the condenser 335, so long as it sustains a value above a predetermined limit, acts as one of three voltages applied to a coincidence circuit of the split limit detector. This affords a coincidence gate which, under the three controlling coincidence voltages, gates the action of trigger circuit 283 into the defect indicator and display systems only if the split in the second sound exceeds a significant preselected limit, here taken as 50 milliseconds.

The gate circuit comprises transistors 340 and 341 connected in series between the positive and negative voltage supplies. Trigger circuit 283 is dynamically coupled to the base of transistor 340 so as to cause this transistor to tend to conduction as trigger generator 283 goes into its activated position by a positive swing on the collector of transistor 329. Conduction of transistor 340 is, however, controlled by its series transistor 341, the base of which is connected to diodes 342, 343, and 344. The anodes of all these three diodes must simultaneously be conducting to transmit the signal applied to the base of transistor 340.

The anode of diode 342 is coupled to the collector of transistor 332 which is normally conducting. Therefore, this prevents the indication of a defective second sound during all periods in which delay multivibrator 284 is activated.

The anode of diode 343 is connected to condenser 335, and consequently the gate is disabled save during the persistence of an operative gating potential on this condenser. While this potential may be achieved early in the activated period of relay multivibrator 284, it cannot cause conduction of the gate so long as 284 is activated. It is only after relaxation of the delay multivibrator, and only during the preselected timing period determined by resistance 336 with condenser 335, that gate will be able to achieve conduction by these simultaneous positive control potentials.

The third control potential, applied to diode 344, is derived from a bistable binary memory comprising transistors 345 and 346. This bistable circuit is analogous to the memory circuit comprising transistors 314 and 315 shown in FIG. 6 in connection with the systolic interval integrator. Transistor 346 is normally non-conductive because, if rendered conductive in any cardiac cycle, it is reset by application of a reset pulse from the first sound interval generator 201, applied through diode 347 to its base. Its collector is connected to the anode of diode 344 so that the detection of the first defective split in the second sound will encounter open gate conditions so far as the memory is concerned, but thereafter subsequent defective splits will not tend again to throw over this bistable circuit.

To review the operation of the second sound evaluation network, trigger circuit 283 attempts through transistor 340 to de-activate transistor 345 of the bistable memory each time it goes into conduction. This is rendered impossible by the control voltages on diodes 342, 343 and 344, unless the delay multivibrator 284 is inactive and condenser 335 retains its necessary gating control voltage (unless transistor 345 has previously been thrown into conduction) and further provided that the second sound amplitude under these conditions again triggers Schmitt relay 283.

Where such sequence occurs, transistor 346 assumes conduction, permits indicator light control transistor 348 to cut off and permit transistor 349 in series with indicator light 350 to go into saturation. At the same time lead 351 supplies a defect signal to the defect counter display 109 to be further described below. The bistable memory is reset at the end of the first sound of the subsequent cardiac cycle to reset the network for evaluation of the subsequent second sound.

The defect counter display and the associated control circuitry will be explained in connection with FIGURE 8. As mentioned above, each evaluation channel includes a detector for the heart sound characteristics outside normal limits. These are shown in FIGURE 8 as 107, 111, and 114, the systolic and diastolic integrator limit detectors, and the split second sound drop-out detector, respectively. Heart sound characteristics outside normal limits in the respective functional phases of the cardiac cycle will cause one or more of these detectors on that cardiac cycle to activate its bistable binary memory. Bistable memory 360 is shown in detailed circuitry in FIGURE 6 operated by the systolic integrator limit detector, as comprising a bistable multivibrator circuit with transistors 314 and 315. The output signal of this memory circuit, assuming that the systolic integrator reaches an outside normal limits voltage level toward the end of the period, is shown at 24 in FIG. 10L. As earlier described the memory is reset, like the other memories, at the trailing edge of the first heart sound multivibrator 291. This signal is capacitatively coupled from the collector of the transistor to transistor 226 of FIGURE 4.

Bistable memory 361 is entirely similar to that shown in FIGURE 6 in connection with transistors 314 and 315. The output wave form of memory 361, assuming a defect level is accumulated intermediate the diastolic interval, is shown at 26 in FIG. 10N.

The bistable memory 362 of the second heart sound channel is shown in FIGURE 7 including transistors 345 and 346. Assuming that a drop out is signaled by the split second sound detector 114, toward the end of the second sound interval, its wave form is shown at 25 in FIG. 10M.

The three bistable memories shown in FIGURE 8 are simultaneously reset as explained in connection with memory 360. It may for some purposes be desired to include other cardiac action evaluation channels, and if so additional similar bistable memories may be employed. For instance, it may be desirable to indicate to the attendant excessively high or excessively low cardiac rates. For this purpose, a frequency meter type network responsive to the electrocardiac signal trigger generator 158 could be suitably employed. Furthermore, the negative R wave characteristic detector could also be used to operate another bistable memory to signal the heart defect if this is considered desirable.

As shown in FIGURE 8, the output signals from bistable memories 360, 361 and 362 are respectively fed to the anodes of diodes 363, 364 and 365. The presence of any one such output signal at the end of any cardiac cycle will be a sufficient condition to cause transmission of a signal through gate 366, subject to collateral control.

The condition of the bistable memories can be simultaneously sampled at any time during the first heart sound interval, as is obvious from inspection of FIGS. 10L, 10M, and 10N. Conveniently, the sampling can occur at the time the total systole timing delay multivibrator is triggered by electrocardiac trigger generator 158. For this purpose, a connection may be taken from the base of transistor 225 shown in FIGURE 4 by lead 257. This provides a negative pulse complementary to wave form 19 in FIG. 10F which is differentiated to provide a negative pulse at the beginning of the cardiac cycle. Obviously, a similarly timed signal could be obtained from electrocardiac trigger generator 158, as well as from the total systole timing delay multivibrator 202. This pulse is applied to the signal input channel of gate 366 and gate 367.

The outputs of these gates operate the counter circuitry which supplies the operator with an indication of the number of cycles evaluated and the number of such cycles which lie outside normal limits. For this purpose, control network 120 permits the operator to initiate evaluation of a preselected number of successive cardiac cycles, which may be 10, 20 or 30 or such other sequences as may be desired. After presetting the counter control network, he can initiate the counting operation by a suitable start switch, and the circuit which will continue to accumulate the information delivered about the subject until the preset number of cardiac cycles has been completed. For this purpose, control network 120 provides a gating signal to both gates 367 and 366. The gating control signal supplied to gate 367 merely permits the desired number of pulses from the leading edge of generator 202 to pass through to a counter, which may conveniently be embodied as electro-mechanical counter 369. Each cardiac pulse during the counting period is responded to by counter 369, and its sucessive counting operations are fed back to the counter control network 120, which after the preset sequence is completed transmits a signal to prevent further transmission of pulses from generator 202 through gate 367, and also through gate 366.

During the counting sequence, transmission through gate 366 is doubly dependent upon an enabling voltage from the control network 120, and the presence of a defect signal condition on any one or more of the bistable memories. Thus, only pulses from generator 202 which are signaled as defective by one of the latter networks will be counted and shown on an accumulated total by a second counter for cardiac cycles outside normal limits. This may conveniently be arranged as electro-mechanical counter 370.

Thus, at the end of the selected indicating sequence, electro-mechanical counters 369 and 370 may be read by the attendant to determine the number of defective cardiac cycles signaled by the evaluation circuits and simultaneously the total number of cycles evaluated. He may then, as will appear below, resets the counters and the associated circuitry for subsequent count on the same subject with a different microphone position, or he may proceed to test another subject.

Figure 9:
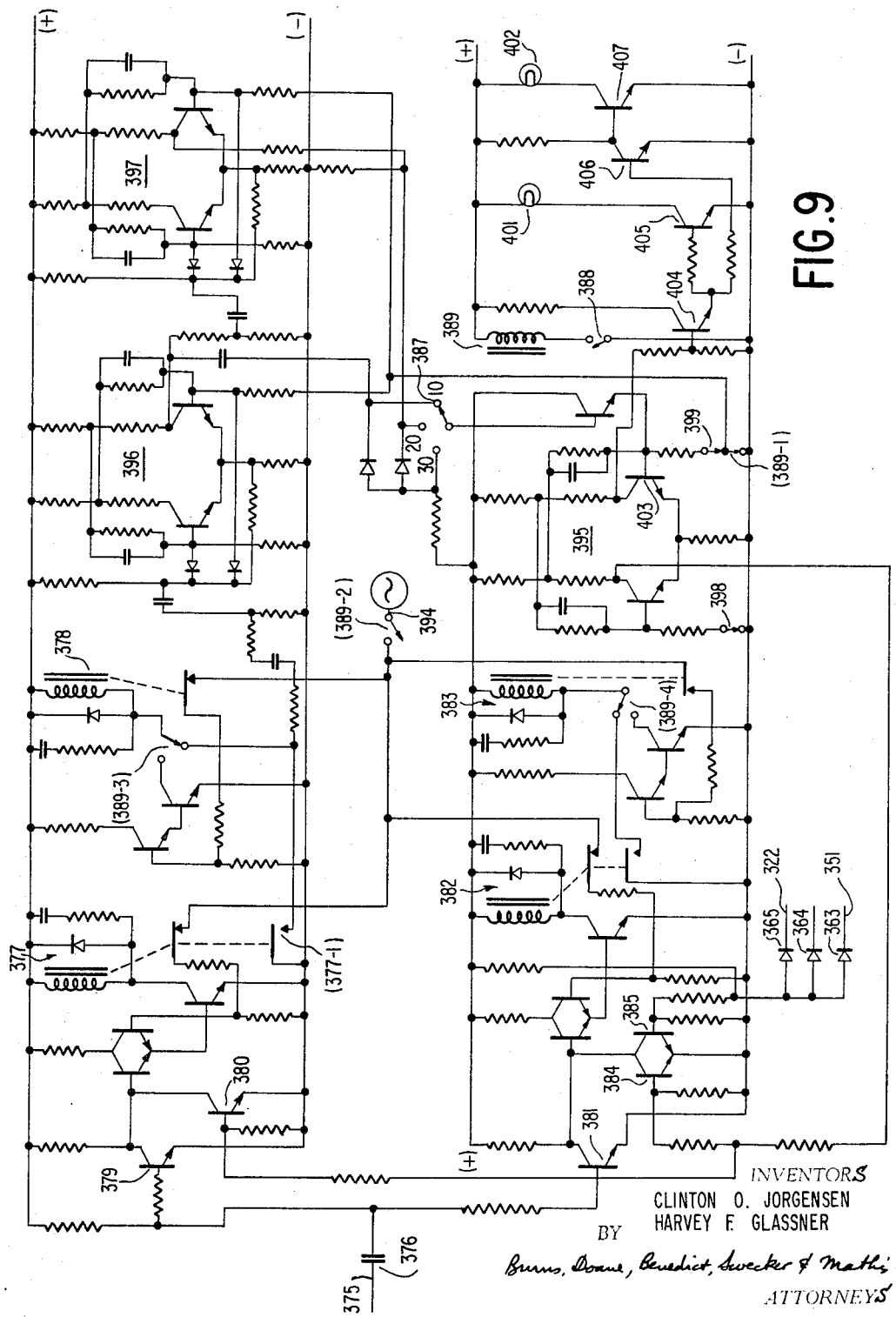
FIGURE 9 shows a circuit for the defect counter display.

The essential circuitry of gates 366 and 367, the counter devices 369 and 370, and the control network will be further discussed in connection with FIG. 9.

The output from the total systole timing multivibrator 202 is provided at line 375 with negative going polarity differentiated to provide a negative input pulse to the network through condenser 376. Such pulses are shown in FIG. 10P. As will appear, under the suitable controls, this pulse at the beginning of each cardiac cycle may operate a pair of electro-mechanical counters for summing the number of cycles examined, 377 is the units counter and 378 is the tens counter. These are conventional units, comprising stepping type devices and the tens counter being advanced one step on completion of each ten counts by the unit counter. Each negative pulse from condenser 376 unblocks the transistor 379 to advance unit counter 377 one step, provided transistor 380 is not in saturated conduction. These two transistors constitute gate 367 shown in FIG. 8.

Each negative pulse from condenser 376 is also fed to transistor 381. This pulse may similarly activate the outside normal limits unit counter 382, which in turn will advance the outside normal limits tens counter 383 every tenth step. Transmission of the signal from transistor 381 to counter 382 is subject to dual control exercised by transistors 384 and 385. These transistors with transistors 381, form gate 366. Transistor 384 is programmed by the counter controls network, while transistor 385 is fed by diodes 363, 364 and 365. Thus, the existence of any defect signal output from any one or more of the bistable memories will block conduction of transistor 385 and permit the signal from transistor 381 to activate unit counter 382. This operation will take place provided transistor 384 (controlled in parallel with transistor 380 in the number of cycles examined channel) is also non-conductive.

It will therefore be seen that during any examination sequence, counters 377 and 378, will indicate the total number of cycles examined, while counters 382 and 383 will indicate the number of defective cycles which occurred during this sequence. The ratio of these counts is a significant factor for professional medical consideration.

Is is convenient to permit the attendant to preset the instrument to count a desired number of cycles, and means have been provided to allow him to select, say, 10, 20 or 30 counts. For this purpose switch 386 may be set for ten counts at contact 387. Reset switch 388 is then momentarily closed to activate relay 389 and open its control contacts 389–1, close contacts (389–2) and shift the double pole switches (389–3) and (389–4). Contacts (389–2) energizes the counters from a line 394 carrying a pulsating current, which in a fraction of a second steps all the electro-mechanical counting units to zero. For this purpose, line 394 need only be provided with power frequency alternating voltage.

Turning now to contacts (389–1) of the reset relay, opening this circuit establishes the desired initial conditions for the counting operation in the start-stop control binary circuit 395 (a bistable multivibrator network) and also simultaneously in a pair of binary counters 396 and 397.

Under these circumstances, the count control binary 395 maintains gate transistors 380 and 384 in conduction to block transmission of the negative impulses from condenser 376.

Now start switch 398 may be momentarily opened to throw binary 395 into its second state. This blocks both transistors 380 and 384 and immediately permits the number of cycles examined electro-mechanical counters 377 and 378 to begin operation. In the arrangement mentioned above, where switch 386 is set to contact 387, on the tenth count of counter 377, counter 378 is advanced one step by closure of contacts 377–1 and simultaneously binary counter 396 reverses to its alternate bistable state. The latter through contact 387 throws the start-stop count control binary 395 back to its original condition. This in turn causes transistors 380 and 384 again to block the input pulses from condenser 376.

During this counting sequence, the counter control networks have been without effect on gate transistor 385. This transistor normally blocks gate 366 in the absence of a defect signal condition subsisting on any one or more of the binary memories 360, 361 and 362. Should, however, any of the diodes 363, 364 and 365 be carrying a negative signal when the negative pulse from condenser 376 appears, the latter pulse will activate electro-mechanical counter 382. Consequently, when binary 396, in the example chosen, terminates the counting cycle, the attendant may observe and note the number of any of the cycles in which the subject exhibits heart sound characteristics outside normal limits, and simultaneously the total number of counts occurring in the sequence.

If during a counting sequence the attendant for any reason should wish to stop the count, this can be done by momentarily opening switch 399 to reverse the condition of binary 395 and cause the transistors 380 and 384 to block their respective gates.

The operation of the counter control network when switch 386 is set for 20 or 30 cycles to be examined is conventional and involves the additional operation of binary counter 397.

The condition of count control binary 395 may be indicated by panel lamps 401 and 402. Their network operates in dependency on the state of conduction of transistor 403 of the count control binary 395, whose collector voltage through transistors 404 and 405 causes the lamp of 401 to light when transistor 403 is non-conductive. While transistor 403 is providing a low potential to the base of transistor 404, transistor 406 is cut off and transistor 407 causes lamp 402 to be energized.

In reference to the use of the defect counter display 109, it will of course be understood that so long as the electrocardiac signal and the heart sound signal are supplied from the subject to the respective input channels of the equipment, that the defect indicators 108, 112 and 115 are fully operative to inform the attendant of defective cardiac sound characteristics selectively detected in any of these functional phases of the cardiac cycle during the examination. None the less, it would be difficult by observation to arrive at a valid statistical summary such as is provided from the defect counter display. Consequently, it is highly desirable that these features be employed.

The operation of the apparatus as a whole is intended, so far as possible, to yield information closely correlated with the results of professional auscultation. The effectiveness with which this is achieved depends in large part upon the definition of the successive functional time phases allocated to the respective functions constituting the overall heart cycle. Extensive observation and research has led to the conclusion that the first heart sound should be allocated approximately 110 milliseconds of the overall cycle, a time duration which will be proportionately contracted with heart rates above about 100 beats per minute. The total systole, at about 70 beats per minute, should be allocated about 320 milliseconds, of which the last 210 milliseconds would comprise the systolic interval. The 210 milliseconds in general should be varied proportionately to the cardiac rate.

Following the total systole, the second sound is allocated a duration of the order of 115 milliseconds being contracted at cardiac rates above about 100 beats per minute. The remainder of the cycle, after the second sound and persisting until the beginning of the first sound, is allocated to the diastolic interval. Again, this time duration will be modulated in accordance with the cardiac rate. While the time periods just discussed represent the best present information, they obviously depend on expert professional judgment, and others may prefer to employ different allocations. Consequently, the data are to be taken as exemplary rather than as restrictive. For the analysis of signal characteristics of a recurrent phenomenon other than heart action, the functional time phase ranges selected would be determined wholly with respect to the phenomenon under observation.

While the invention as here disclosed comprises exemplary specific examples of the circuit components, it will be understood that the scope of the invention is to be determined with reference to the appended claims.

What is claimed is:

1. The method of evaluating heart sound comprising: generating an electrical signal derived from heart sound generated through a plurality of successive heart cycles,
generating a keying signal in substantially uniform phase relation with the first heart sound of each cycle,
generating timing pulses in dependency on the keying signals having a duration which is less than that of said heart cycle.
varying the duration of the timing pulses responsively to changes in duration of the heart cycle,
electrically measuring the electrical heart sound signal during each timing pulse to produce a resultant signal, and
generating a distinctive output signal only when the resultant signal deviates from a selected range.

2. The method of evaluating heart sound comprising: generating an electrical signal derived from heart sound generated through a plurality of successive heart cycles each comprising as successive functional intervals the first heart sound, the systolic interval, the second heart sound, and the diastolic interval,
generating a keying signal in substantially uniform phase relation with the said first heart sound of of each cycle,
generating timing pulses in dependency on the keying signals having a duration which is substantially coextensive with a selected functional interval.
varying the duration of the timing pulses responsively to changes in the duration of the heart cycle,
electrically measuring the electrical heart sound signal during each timing pulse to produce a resultant signal, and
generating a distinctive output signal only when the resultant signal deviates from a selected range.

3. The method of claim 2 further including the step of contracting the timing pulses with increase in heart rate only in a range above a preselected heart rate.

4. The method of claim 2 further including advancing the time phase at which the timing pulse is initiated with increase in heart rate.

5. The method of evaluating heart sound comprising: generating an electrical signal derived from heart sound generated through a plurality of successive heart cycles each comprising as successive functional intervals the first heart sound, the systolic interval, the second heart sound, and the diastolic interval,
generating a keying signal in substantially uniform phase relation with the said first heart sound of each cycle,
generating timing pulses in dependency on the keying signals coextensive with one of said intervals and having a duration beginning with the end of said heart sounds and ending with the onset of the next of said heart sounds,
varying the duration of the timing pulses inversely with heart rate responsively to changes in the heart rate,
electrically measuring the electrical heart sound signal during each timing pulse to produce a resultant signal, and
generating a distinctive output signal only when the resultant signal deviates from a selected range.

6. The method of evaluating the second heart sound comprising:
generating an electrical signal derived from heart sound generated through a plurality of successive heart cycles each comprising successively the first heart sound, the systolic interval, the second heart sound, the diastolic interval,
generating keying signals in substantially uniform phase relation with the said first heart sounds,
generating timing pulses in dependency on the keying signals each having a duration beginning with the end of the systolic interval and ending with the end of the said second heart sound,
varying the duration of the timing pulses responsively to changes in heart rate,
feeding the electrical heart sound signal only during each timing pulse to a signal continuity discriminating network responsive to signal drop out below a predetermined level, and
generating a distinctive output signal from said network only when said second sound signal comprises a drop out in excess of a selected limit.

7. The method of claim 6 further including contracting the duration of the timing pulses with increase in heart rate only in a range above a preselected heart rate.

8. Means for evaluating heart sound comprising:
means for generating an electrical signal derived from heart sound generated through a plurality of successive heart cycles each comprising as successive functional intervals the first heart sound, the systolic interval, the second heart sound, the the diastolic interval, timing means operative to generate timing signals having a duration which is substantially coextensive with a selected functional interval and varying inversely with heart rate responsively to changes in heart rate, evaluation network means receiving the signal from the first recited means operative only during the timing signals in dependency on the timing signals to produce a resultant signal having a value dependent upon the electrical heart sound signal during the selected functional interval, and means for generating an output signal operative in dependency on the value of the resultant signal to signal to supply a distinctive output only when said resultant signal value deviates from a selected range of values.

9. The structure of claim 8 wherein the evaluation network constitutes an accumulated energy level responsive network.

10. The structure of claim 8 wherein the evaluation network constitutes a signal continuity discriminating network responsive to signal drop out below a predetermined level.

11. The structure of claim 8 wherein the timing means comprises means operative to contract the timing signal duration with increase in heart rate only in a range above a preselected heart rate.

12. The structure of claim 8 wherein the timing means comprises:
means for generating keying signals in substantially uniform phase relation with the said first heart sound, and
means operating in dependency on the keying signals for generating pulses having a duration corresponding to the selected functional interval.

13. The structure of claim 8 wherein the timing means comprises:
means for generating keying signals in substantially uniform phase relation with the said first heart sound, and
means operating in dependency on the keying signals for generating timing pulses coextensive with one of said intervals and having a duration beginning with the end of one of said heart sounds and terminating with the onset of the next of said heart sounds.

14. The structure of claim 8 wherein the timing means comprises:
means for generating keying signals in substantially unform phase relation with the said first heart sound,
means operating in dependency on the keying signals for generating timing pulses having a duration substantially coextenisive with the said second heart sound, and
means for contracting the time duration of said timing pulses with increase in heart rate only in a range above a preselected heart rate.

15. Means for evaluating heart sound comprising:
means for generating an electrical signal derived from heart sound generated through a plurality of successive heart cycles,
timing means recurrently operative to generate timing signals having a duration which is less than that of said heart cycle comprising:
first timing pulse generator means having first signal responsive timing pulse duration control means,
second timing pulse generator means operative in timed relation to termination of a pulse supplied by the first timing pulse generator means having second signal responsive timing pulse duration control means,
means for generating duration control signals for the first and second timing pulse generator means operating responsively to the timing pulses generated thereby to terminate the timing pulse generated by the second timing pulse generator means substantially with initiation of the succeeding timing pulse generated by the first timing pulse generator means, and
means responsive to the means for generating duration control signals to generate said timing signals with durations varying inversely with heart rate, evaluation network means receiving the signal from the first recited means operative only during the timing signals in dependency on the timing signals to produce a resultant signal having a value dependent upon the electrical heart sound signal during the timing signal duration, and means for generating an output signal operative in dependency on the value of the resultant signal to supply a distinctive output only when the resultant signal value deviates from a selected range of values.

16. The method of evaluating heart sound comprising:
generating an electrical signal derived from heart sound generated through a plurality of successive heart cycles each comprising as successive functional intervals the first heart sound, the systolic interval, the second heart sound, the diastolic interval,
generating a keying signal in substantially uniform phase relation with the said first heart sound of each cycle,
generating timing pulses in dependency on the keying signals having a duration which is substantially coextensive with a selected functional interval,
electrically measuring the electrical heart sound signal during each timing pulse to produce a resultant signal,
generating a distinctive output signal only when any one of said resultant signals deviates from a selected range, and
indicating after a predetermined number of measurements both the number of heart cycles measured and the number of cycles in which said resultant signal deviates from a selected range.

17. Means for evaluating heart sound comprising:
means for generating an electrical signal derived from heart sound generated through a plurality of successive heart cycles each comprising as successive functional intervals the first heart sound, the systolic interval, the second heart sound, and the diastolic interval,
timing means for generating timing signals having a duration substantially coextensive with a selected functional interval,
evaluation network means receiving the signal from the first recited means operative in dependency on the timing means selectively during successive selected functional intervals to produce a resultant signal,
means for generating an output signal if the resultant signal deviates from a selected range, and
means for indicating, after a preselected number of heart cycles, the number of cycles evaluated and the number of cycles thereof in which a distinctive output signal was generated.

References Cited by the Examiner

UNITED STATES PATENTS

| | | | |
|---|---|---|---|
| 2,756,741 | 7/1956 | Campanella | 128—2.05 |
| 3,101,082 | 8/1963 | Steen et al. | 128—2.05 |
| 3,123,768 | 3/1964 | Burch et al. | 128—2.06 X |
| 3,129,704 | 4/1964 | Burt | 128—2.1 |
| 3,132,208 | 5/1964 | Dymski et al. | 128—2.05 X |
| 3,140,710 | 7/1964 | Glassner et al. | 128—2.05 |
| 3,144,018 | 8/1964 | Head | 128—2.05 |

RICHARD A. GAUDET, *Primary Examiner.*

S. BRODER, *Examiner.*